US012652537B2

(12) United States Patent
Liu et al.

(10) Patent No.: US 12,652,537 B2
(45) Date of Patent: Jun. 9, 2026

(54) NAN TRUSTED DEVICE CLUSTER

(71) Applicant: Apple Inc., Cupertino, CA (US)

(72) Inventors: Yong Liu, Campbell, CA (US); Lawrie Kurian, San Jose, CA (US); Charles F Dominguez, San Carlos, CA (US); Charles W Duyk, San Francisco, CA (US); Tashbeeb Haque, San Francisco, CA (US); Su Khiong Yong, Palo Alto, CA (US); Manav Gabhawala, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 930 days.

(21) Appl. No.: 17/731,454

(22) Filed: Apr. 28, 2022

(65) Prior Publication Data

US 2022/0353682 A1 Nov. 3, 2022

Related U.S. Application Data

(60) Provisional application No. 63/182,543, filed on Apr. 30, 2021.

(51) Int. Cl.
H04W 12/06 (2021.01)
H04W 12/0431 (2021.01)
(Continued)

(52) U.S. Cl.
CPC ..... H04W 12/068 (2021.01); H04W 12/0431 (2021.01); H04W 12/50 (2021.01); H04W 84/12 (2013.01)

(58) Field of Classification Search
CPC ..... H04L 67/104; H04L 45/46; H04L 9/0861; H04L 2209/80; H04W 8/005;
(Continued)

(56) References Cited

U.S. PATENT DOCUMENTS

| | | | | |
|---|---|---|---|---|
| 9,312,926 B2 * | 4/2016 | Neafsey | ................. | G06F 21/35 |
| 10,004,033 B2 * | 6/2018 | Kasslin | ................. | H04W 48/18 |

(Continued)

FOREIGN PATENT DOCUMENTS

WO WO-2019091668 A1 * 5/2019 ............ H04W 12/04

*Primary Examiner* — Lizbeth Torres-Diaz
(74) *Attorney, Agent, or Firm* — Kowert, Hood, Munyon, Rankin & Goetzel, P.C.

(57) ABSTRACT

One or more wireless stations operate to configure direct communication with neighboring mobile stations, e.g., direct communication between the wireless stations without utilizing an intermediate access point. A wireless station may enter an unsynchronized discovery mode, transmit, in response to receiving a subscribe message from a neighboring device, a publish message to the neighboring device, perform authentication and trusted device cluster provisioning with the neighboring wireless device, and protect transmissions using the security credentials. In the unsynchronized discovery mode, the wireless device may monitor a discovery channel for subscribe messages, e.g., from neighboring peer devices. Additionally, the trusted device cluster provisioning may provide security credentials to the wireless device. Note that protecting transmissions using the security credentials may include protecting a trusted device cluster identity, transmitted beacons, transmitted management frames, or transmitted action frames using the security credentials acquired via the trusted device cluster provisioning.

20 Claims, 13 Drawing Sheets

(51) Int. Cl.
　　　*H04W 12/50*　　　　(2021.01)
　　　*H04W 84/12*　　　　(2009.01)
(58) Field of Classification Search
　　　CPC ... H04W 48/16; H04W 12/068; H04W 12/50;
　　　　　　　H04W 12/0431; H04W 84/12; H04W
　　　　　　　　　12/06; G06F 21/35; G06F 21/43
　　　See application file for complete search history.

(56) References Cited

U.S. PATENT DOCUMENTS

| | | | | |
|---|---|---|---|---|
| 11,159,941 | B2 | 10/2021 | Vanderveen et al. | |
| 2009/0164788 | A1* | 6/2009 | Cho ................... | H04W 12/041 |
| | | | | 713/175 |
| 2017/0026282 | A1* | 1/2017 | Huang ................ | H04W 8/005 |
| 2018/0359633 | A1* | 12/2018 | Liu ...................... | H04L 9/3226 |
| 2019/0053059 | A1* | 2/2019 | Vanderveen ........... | H04L 45/20 |

* cited by examiner

| Field | Size (Octets) | Description |
|---|---|---|
| FC | 2 | Frame Control field |
| Duration | 2 | Duration value for the beacon frame |
| A1 | 6 | Broadcast Address |
| A2 | 6 | Transmitter MAC address |
| A3 | 6 | Cluster ID identifying the NAN cluster |
| Seq. Ctrl | 2 | Sequence Control field |
| Time Stamp | 8 | Time Stamp of the beacon frame |
| Beacon Interval | 2 | Time units between beacons |
| Capability | 2 | Capability information field |
| NAN IE | Variable | NAN information element |
| FCS | 4 | Frame checksum |

*FIG. 4A*

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| NAN attributes | Variable | One or more NAN attributes |

*FIG. 4B*

| Attributes | NAN SDF Frames | | | | |
| --- | --- | --- | --- | --- | --- |
| | Publish | | | Subscribe | Follow-up |
| | Data | Ranging | Otherwise | | |
| Master Indication | NO | NO | NO | NO | NO |
| Cluster | NO | NO | NO | NO | NO |
| Service ID List | NO | NO | NO | NO | NO |
| Service Descriptor | YES/M | YES/M | YES/M | YES/M | YES/M |
| NAN Con. Cap. | YES/O | YES/O | YES/O | YES/O | YES/O |
| WLAN Infra | YES/O | YES/O | YES/O | YES/O | YES/O |
| P2P Operation | YES/O | YES/O | YES/O | YES/O | YES/O |
| IBSS | YES/O | YES/O | YES/O | YES/O | YES/O |
| Mesh | YES/O | YES/O | YES/O | YES/O | YES/O |
| Further Service Dis | YES/O | YES/O | YES/O | YES/O | YES/O |
| Further Avail Map | YES/O | YES/O | YES/O | YES/O | YES/O |
| Country Code | YES/O | YES/O | YES/O | YES/O | YES/O |
| Ranging | YES/O | YES/O | YES/O | YES/O | YES/O |
| Cluster Discovery | NO | NO | NO | NO | NO |
| Service Desc. Ext | YES/M | YES/M | YES/O | YES/O | YES/O |
| Device Cap. | YES/M | YES/M | YES/O | YES/O | YES/O |
| NDP | NO | NO | NO | NO | NO |
| NAN Availability | YES/M | YES/M | YES/O | YES/O | YES/O |
| NDC | YES/O | YES/O | YES/O | YES/O | YES/O |
| NDL | NO | NO | NO | NO | NO |
| NDL QoS | NO | NO | NO | NO | NO |
| Unaligned Sched. | YES/O | YES/O | YES/O | YES/O | YES/O |
| Ranging Info. | NO | YES/M | NO | NO | YES/O |
| Ranging Setup | NO | NO | NO | NO | NO |
| FTM Rang. Rep. | NO | NO | NO | NO | NO |
| Element Container | YES/O | YES/O | YES/O | YES/O | YES/O |
| Ex. WLAN Infra. | YES/O | YES/O | YES/O | YES/O | YES/O |
| Ex. P2P Operation | YES/O | YES/O | YES/O | YES/O | YES/O |
| Ex. IBSS | YES/O | YES/O | YES/O | YES/O | YES/O |
| Ex. Mesh | YES/O | YES/O | YES/O | YES/O | YES/O |
| Cipher Suit Info. | YES/O | YES/O | YES/O | YES/O | YES/O |
| Security Con. Info. | YES/O | YES/O | YES/O | YES/O | YES/O |
| Shared-Key Desc. | NO | NO | NO | NO | NO |
| Public Availability | YES/O | YES/O | YES/O | YES/O | YES/O |
| Vendor Specific | YES/O | YES/O | YES/O | YES/O | YES/O |

FIG. 4C

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| OUI Subtype | 1 | Identifying type of NAN action frame |
| Information Content | variable | Fields and/or attributes for specific NAN action frames |

*FIG. 4D*

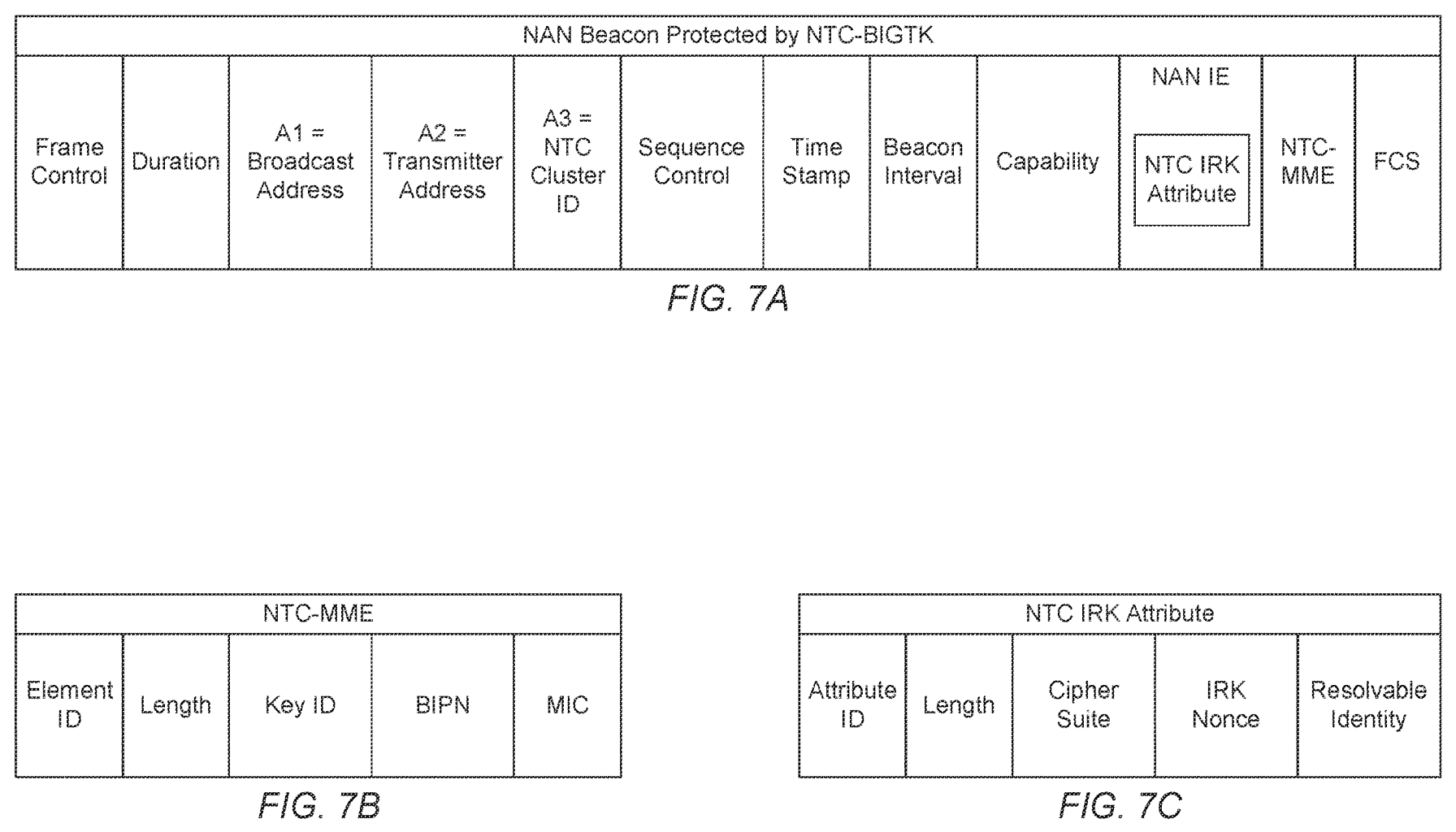

NAN Beacon Protected by NTC-BIGTK

| Frame Control | Duration | A1 = Broadcast Address | A2 = Transmitter Address | A3 = NTC Cluster ID | Sequence Control | Time Stamp | Beacon Interval | Capability | NAN IE | NTC-MME | FCS |
|---|---|---|---|---|---|---|---|---|---|---|---|
| | | | | | | | | | NTC IRK Attribute | | |

*FIG. 7A*

NTC-MME

| Element ID | Length | Key ID | BIPN | MIC |
|---|---|---|---|---|

*FIG. 7B*

NTC IRK Attribute

| Attribute ID | Length | Cipher Suite | IRK Nonce | Resolvable Identity |
|---|---|---|---|---|

*FIG. 7C*

Figure 8:
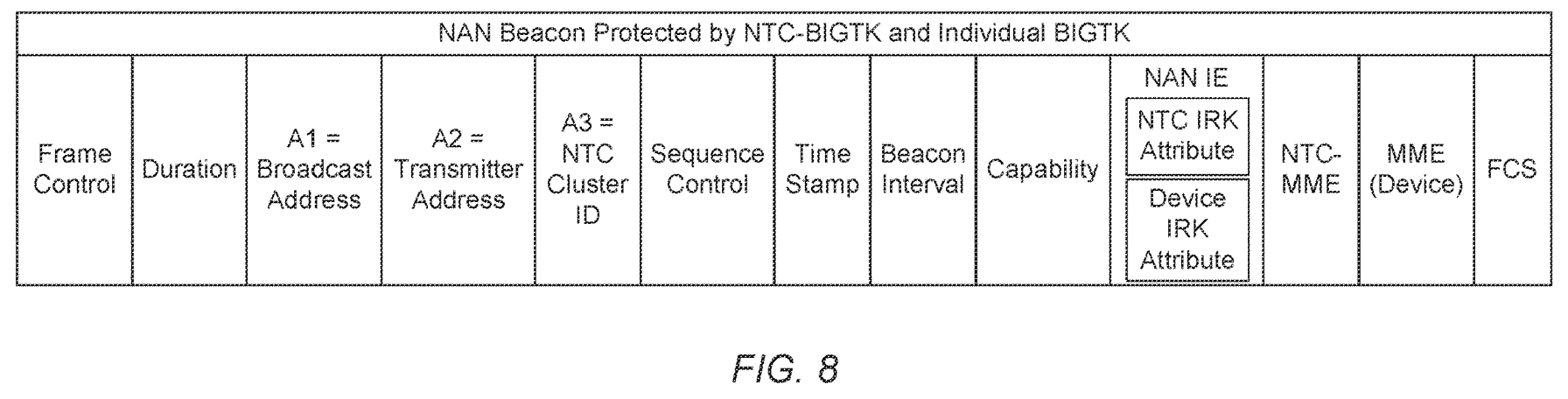

NAN Beacon Protected by NTC-BIGTK and Individual BIGTK

| Frame Control | Duration | A1 = Broadcast Address | A2 = Transmitter Address | A3 = NTC Cluster ID | Sequence Control | Time Stamp | Beacon Interval | Capability | NAN IE | NTC-MME | MME (Device) | FCS |
|---|---|---|---|---|---|---|---|---|---|---|---|---|
| | | | | | | | | | NTC IRK Attribute / Device IRK Attribute | | | |

| SDF or NAF Beacon Protected by NTC-BIGTK |
| --- |
| Frame Control |
| Duration |
| A1 (Unicast or Multicast) |
| A2 = Transmitter Address |
| A3 = NTC Cluster ID |
| Sequence Control |
| Time Stamp |
| Beacon Interval |
| Category |
| Action |
| OUI |
| OUI Type |
| NAN Attributes    NTC IRK Attribute |
| NTC-MME |
| FCS |

*FIG. 9B*

| SDF or NAF Protected by NTC-BIGTK and Individual BIGTK |
| --- |
| Frame Control |
| Duration |
| A1 (Unicast or Multicast) |
| A2 = Transmitter Address |
| A3 = NTC Cluster ID |
| Sequence Control |
| Time Stamp |
| Beacon Interval |
| Category |
| Action |
| OUI |
| OUI Type |
| NAN Attributes · NTC IRK Attribute · Device IRK Attribute |
| NTC-MME |
| MME (Device) |
| FCS |

NAN TRUSTED DEVICE CLUSTER

PRIORITY DATA

This application claims benefit of priority to U.S. Provisional Application Ser. No. 63/182,543, titled "NAN Trusted Device Cluster", filed Apr. 30, 2021, which is hereby incorporated by reference in its entirety as though fully and completely set forth herein.

FIELD

The present application relates to wireless communications, including techniques for scheduling wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Embodiments described herein relate to systems and methods for peer wireless stations (e.g., wireless stations configured to communicate with neighboring wireless stations without utilizing an intermediate access point) to establish a trusted (e.g., secured) cluster of devices within a NAN cluster of devices.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, the communications may be performed via a peer-to-peer wireless communications protocol such as Neighbor Awareness Networking (NAN). Thus, embodiments of the disclosure also relate to NAN devices establishing a secured (e.g., trusted) cluster of devices.

In some embodiments, a wireless station may be configured to perform a method for trusted device cluster provisioning, including entering an unsynchronized discovery mode, transmitting, in response to receiving a subscribe message from a neighboring device, a publish message to the neighboring device, performing authentication and trusted device cluster provisioning with the neighboring wireless device, and protecting transmissions using the security credentials. In the unsynchronized discovery mode, the wireless device may monitor a discovery channel for subscribe messages, e.g., from neighboring peer devices. The subscribe message may be an unsolicited subscribe message and the publish message may be a solicited publish message. Additionally, the trusted device cluster provisioning may provide security credentials to the wireless device. Note that protecting transmissions using the security credentials may include protecting any, any combination of, and/or all of (e.g., at least one of and/or one or more of) a trusted device cluster identity, transmitted beacons, transmitted management frames, or transmitted action frames using the security credentials acquired via the trusted device cluster provisioning. Further, performing authentication and trusted device cluster provisioning may include at least one of peer-to-peer pairing, secured data path setup, and/or out-of-band verification. In addition, the wireless device may verify any, any combination of, and/or all of (e.g., at least one of and/or one or more of) a trusted device cluster identity, received beacons, received management frames, or received action frames using the security credentials acquired via the trusted device cluster provisioning.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4A illustrates an example format of a synchronization/discovery beacon frame, according to some embodiments.

FIG. 4B illustrates an example format of a service discovery frame (SDF), according to some embodiments.

FIG. 4C illustrates an example format of a NAN attribute field, according to some embodiments.

FIG. 4D illustrates an example format of an action frame, according to some embodiments.

FIGS. 7A, 7B, and 7C illustrate examples of NTC beacon protection frame formats, according to some embodiments.

FIG. 8 illustrates another example of an NTC beacon protection frame format, according to some embodiments.

FIGS. 9A and 9B illustrate examples of NTC SDF and NAF protection frame formats, according to some embodiments.

Figure 1:
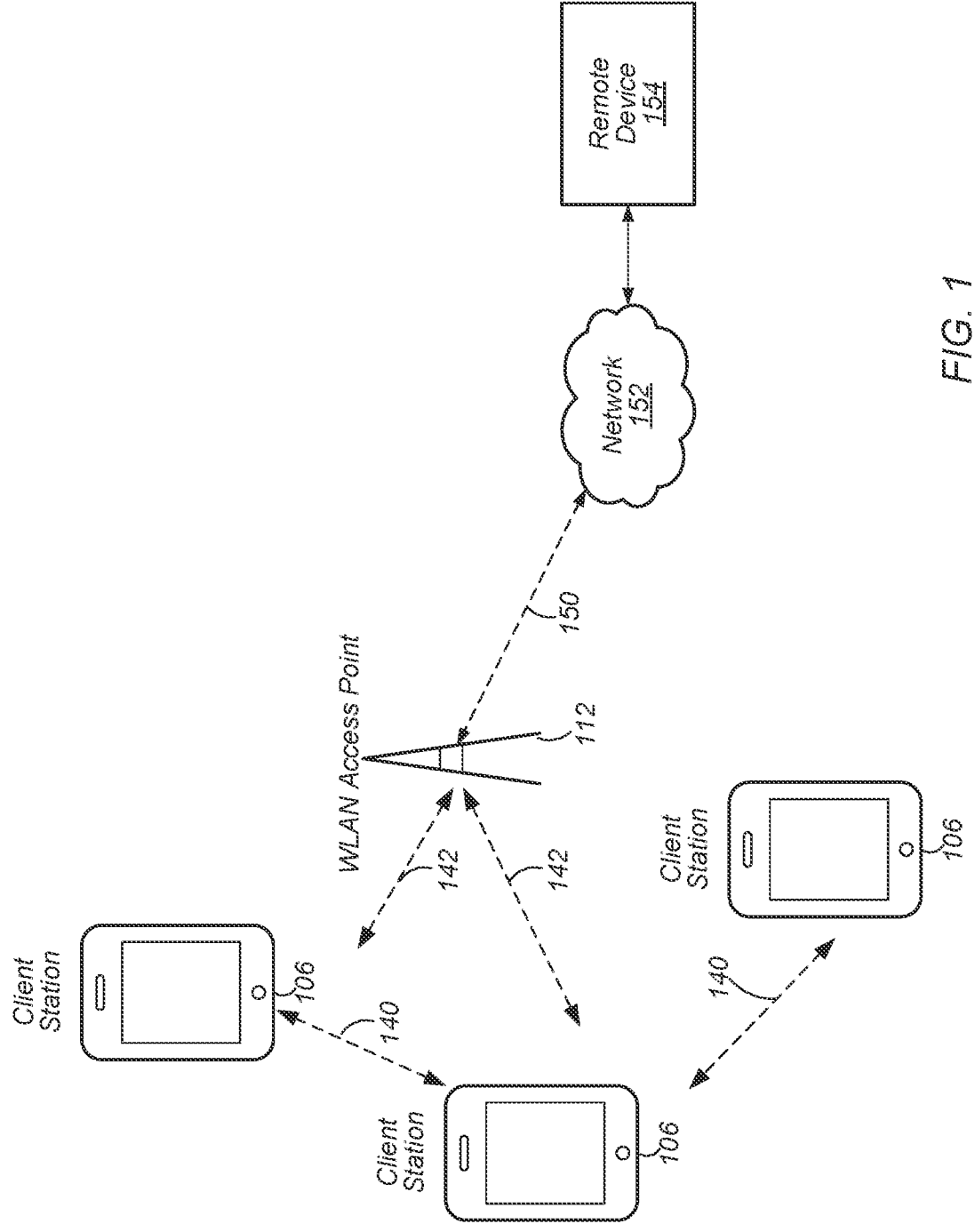
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™ etc. Various other types of devices would fall into this category if they include Wi-Fi or both cellular and Wi-Fi communication capabilities, such as laptop computers (e.g., MacBook™) portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™ Amazon FireTV™, Google Chromecast™, etc.), refrigerators, laundry machines, thermostats, and so forth.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short-range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods for trusted device cluster provisioning, including entering an unsynchronized discovery mode, transmitting, in response to receiving a subscribe message from a neighboring device, a publish message to the neighboring device, performing authentication and trusted device cluster provisioning with the neighboring wireless device, and protecting transmissions using the security credentials. In the unsynchronized discovery mode, the wireless device 106 may monitor a discovery channel for subscribe messages, e.g., from neighboring peer devices. The subscribe message may be an unsolicited subscribe message and the publish message may be a solicited publish message. Additionally, the trusted device cluster provisioning may provide security credentials to the wireless device. Note that protecting transmissions using the security credentials may include protecting any, any combination of, and/or all of (e.g., at least one of and/or one or more of) a trusted device cluster identity, transmitted beacons, transmitted management frames, or transmitted action frames using the security credentials acquired via the trusted device cluster provisioning. Further, performing authentication and trusted device cluster provisioning may include at least one of peer-to-peer pairing, secured data path setup, and/or out-of-band verification. In addition, the wireless device 106 may verify any, any combination of, and/or all of (e.g., at least one of and/or one or more of) a trusted device cluster identity, received beacons, received management frames, or received action frames using the security credentials acquired via the trusted device cluster provisioning.

Figure 2:
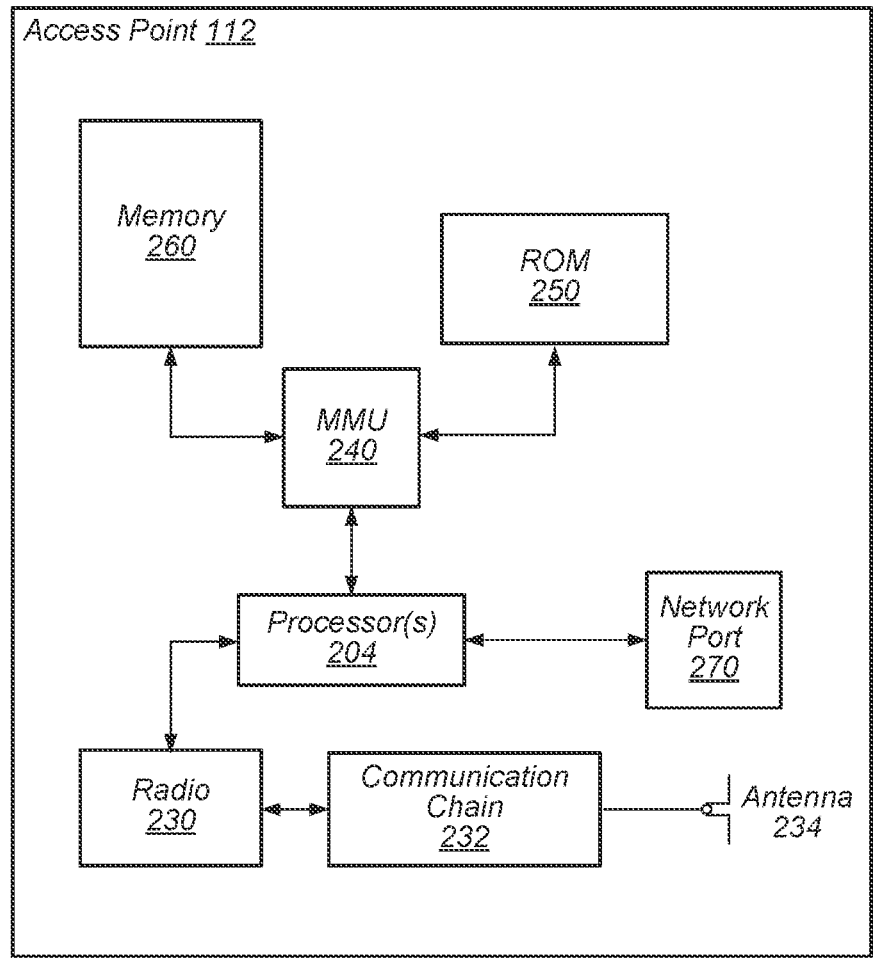
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for trusted device cluster provisioning, including entering an unsynchronized discovery mode, transmitting, in response to receiving a subscribe message from a neighboring device, a publish message to the neighboring device, performing authentication and trusted device cluster provisioning with the neighboring wireless device, and protecting transmissions using the security credentials. In the unsynchronized discovery mode, the AP 112 may monitor a discovery channel for subscribe messages, e.g., from neighboring peer devices. The subscribe message may be an unsolicited subscribe message and the publish message may be a solicited publish message. Additionally, the trusted device cluster provisioning may provide security credentials to the wireless device. Note that protecting transmissions using the security credentials may include protecting any, any combination of, and/or all of (e.g., at least one of and/or one or more of) a trusted device cluster identity, transmitted beacons, transmitted management frames, or transmitted action frames using the security credentials acquired via the trusted device cluster provisioning. Further, performing authentication and trusted device cluster provisioning may include at least one of peer-to-peer pairing, secured data path setup, and/or out-of-band verification. In addition, the AP 112 may verify any, any combination of, and/or all of (e.g., at least one of and/or one or more of) a trusted device cluster identity, received beacons, received management frames, or received action frames using the security credentials acquired via the trusted device cluster provisioning.

Figure 3:
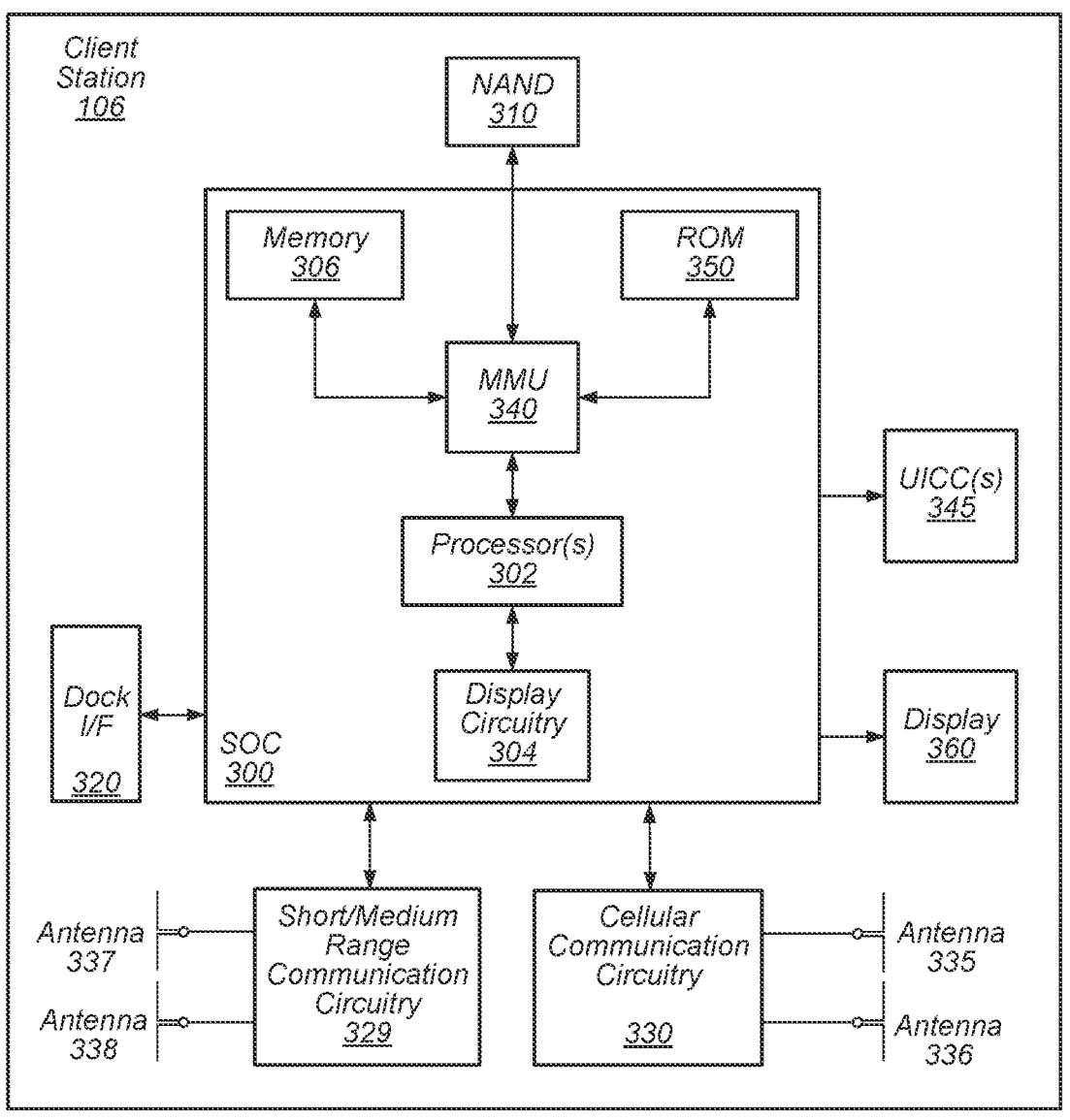
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown.

Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for trusted device cluster provisioning, including entering an unsynchronized discovery mode, transmitting, in response to receiving a subscribe message from a neighboring device, a publish message to the neighboring device, performing authentication and trusted device cluster provisioning with the neighboring wireless device, and protecting transmissions using the security credentials. In the unsynchronized discovery mode, the client station 106 may monitor a discovery channel for subscribe messages, e.g., from neighboring peer devices. The subscribe message may be an unsolicited subscribe message and the publish message may be a solicited publish message. Additionally, the trusted device cluster provisioning may provide security credentials to the wireless device. Note that protecting transmissions using the security credentials may include protecting any, any combination of, and/or all of (e.g., at least one of and/or one or more of) a trusted device cluster identity, transmitted beacons, transmitted management frames, or transmitted action frames using the security credentials acquired via the trusted device cluster provisioning. Further, performing authentication and trusted device cluster provisioning may include at least one of peer-to-peer pairing, secured data path setup, and/or out-of-band verification. In addition, the client station 106 may verify any, any combination of, and/or all of (e.g., at least one of and/or one or more of) a trusted device cluster identity, received beacons, received management frames, or received action frames using the security credentials acquired via the trusted device cluster provisioning.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

Peer-to-Peer Frame Formats

In some embodiments, Wi-Fi devices (e.g., client station 106) may be able to communicate with each other in a peer to peer manner, e.g., without the communications going through an intervening access point. In some embodiments, devices may exchange one or more management frames, e.g., such as synchronization/discovery beacon frames, service discovery frames (SDFs), and/or action frames, in order to synchronize, advertise, solicit, and/or negotiate a peer-to-peer data session, such as a NAN datapath and/or a NAN datalink. In some embodiments, particular management frame formats (e.g., synchronization/discovery beacon frame formats, SDF formats, and/or action frame formats) may be implemented to transport information associated with embodiments disclosed herein.

For example, as illustrated by FIG. 4A, a synchronization/discovery beacon frame format (e.g., as specified by NAN 4.0 and later versions of NAN) may include fields such as a frame control (FC) filed, a duration field, multiple address fields (e.g., A1-A3), a sequence control field, a time stamp field, a beacon interval field, a capability information field, a NAN information element (IE) field, and/or a frame checksum (FCS) field. The frame control field, duration field, sequence control field, time stamp field, beacon interval field, capability field, and FCS field may be defined by IEEE 802.11. Note that for synchronization beacons, the beacon interval field may be set to 512 TUs, which may correspond to a time interval between consecutive starts of discovery windows. In addition, for discovery beacons, the beacon interval field may be set to 100 TUs, which may correspond to an average time between consecutive discovery beacon transmissions by a device in a master role. Addresses may include a broadcast address (A1), a transmitter medium access control (MAC) address (A2), and a cluster identifier address (A3). In some embodiments, the NAN IE may be vendor specific and may be configured to transport information associated with embodiments disclosed herein.

As another example, as illustrated by FIG. 4B, a service discovery frame format (e.g., as specified by NAN 4.0 and later versions of NAN) may include one or more fields, including a category field, an action field, an organizationally unique identifier (OUI) field, an OUI type field, and/or a NAN attributes field. In some embodiments, information associated with embodiments disclosed herein may be transported via the NAN attributes field. In some embodiments, information associated with embodiments disclosed herein may be transported via the OUI field and/or the OUI type field.

Further, as illustrated by FIG. 4C, the NAN attribute field (e.g., as specified by NAN 4.0 and later versions of NAN) includes multiple fields that may be used to implement features of embodiments disclosed herein. For example, in some embodiments, information associated with embodiments disclosed herein may be transported via any of (or any combination of) attributes included in the NAN attribute field. For example, in some embodiments, the vendor specific attribute may be used to transport information associated with embodiments disclosed herein. As another example, the further availability map attribute may be used to transport information associated with embodiments disclosed herein. As shown, the NAN attribute field may contain (or included) different attributes based on a type of NAN SDF frame. For example, a publish SDF frame for data transmission may include both mandatory (M) and optional (O) attributes that differ from a publish SDF frame for ranging and/or other purposes (e.g., "Otherwise"). Similarly, a subscribe SDF frame may include differing attributes as compared to a follow-up SDF and/or the various publish SDF frames. Thus, as a further example, various configurations of a NAN attribute may be used to transport information associated with embodiments disclosed herein.

As yet a further example, as illustrated by FIG. 4D, an action frame format (e.g., as specified by NAN 4.0 and later versions of NAN) may include one or more fields, including a category field, an action field, an OUI field, an OUI type field, an OUI subtype field and/or an information content field. In some embodiments, information associated with embodiments disclosed herein may be transported via the information content field. In some embodiments, information associated with embodiments disclosed herein may be transported via the OUI field, the OUI type field, and/or the OUI subtype field.

Wi-Fi Peer to Peer Communication Protocols

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window, they may exchange synchronization packets to stay synchronized with each other. The wireless stations may also use the discovery window to exchange service discovery frames to convey other information such as further availability beyond discovery windows.

The NAN protocol initially included two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, per NAN 2.0, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Additionally, datapath resource allocation relates to two peer wireless stations communicating with each other regarding a common time slot and channel for communication. In other words, the two devices communicate with each other regarding which channel they should use and at which time slot, to help ensure proper communication between them. In addition, the two devices communicate with each other regarding which channel and time slot each would prefer to use for future communications between the devices.

Further iterations of NAN (e.g., NAN 3.0 and NAN 4.0) introduced features such as TCP/IP support for NAN as well as out-of-band (e.g., Bluetooth and/or Bluetooth Low Energy) triggering of NAN discovery. In particular, support of NAN service discovery over lower energy wireless interfaces was introduced. Thus, wireless stations are enabled to advertise and/or seek NAN services over the lower energy wireless interfaces. Further, near field communication (NFC) triggering for NAN was also introduced.

NAN Trusted Device Cluster

Figure 5:
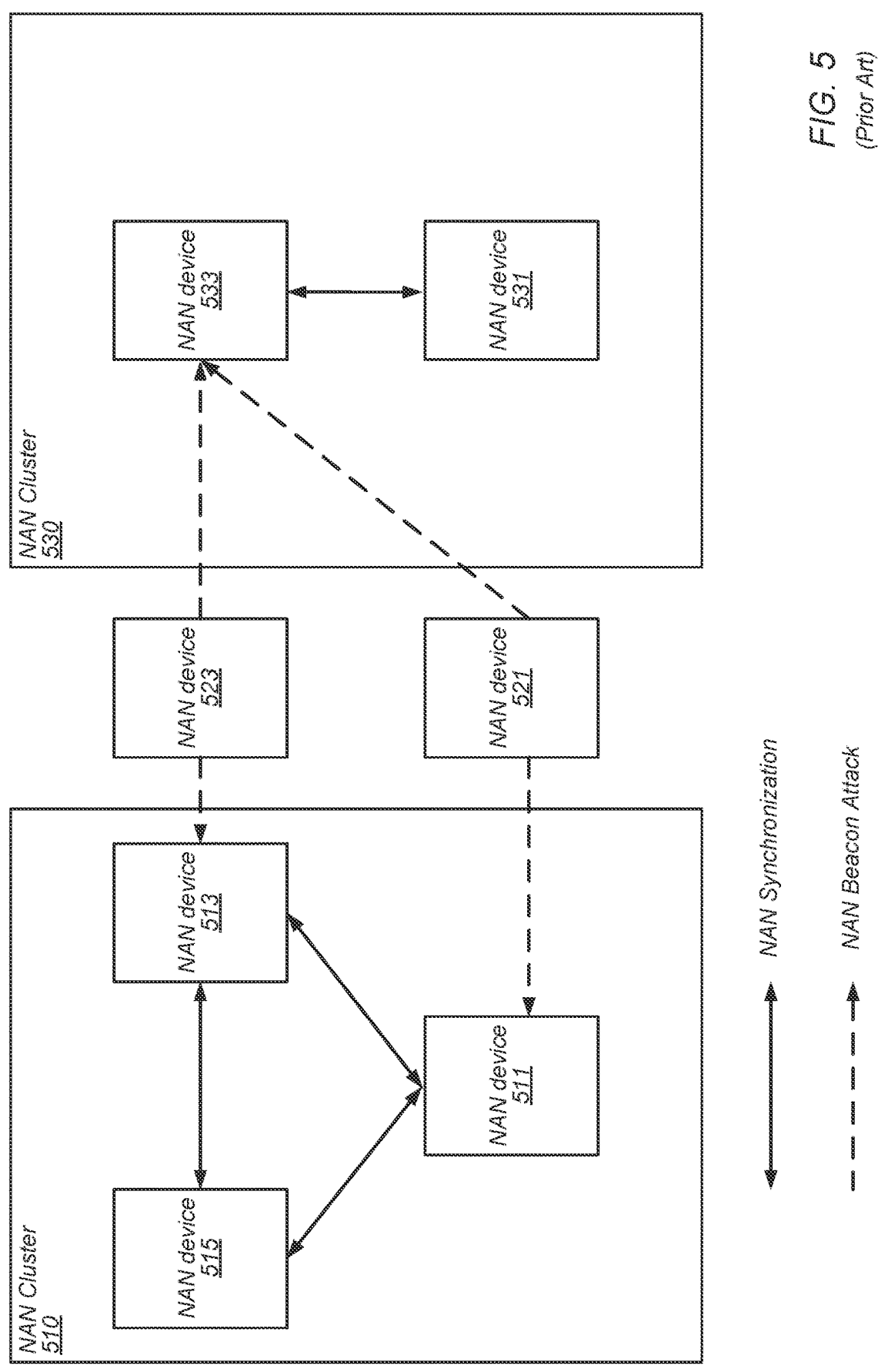
FIG. 5 illustrates an example of a malicious device abusing a NAN synchronization protocol.

In current implementations, the NAN synchronization protocol drives all NAN devices in a neighborhood (e.g., within transmission range) to form a synchronized NAN cluster. An anchor master (e.g., the device with a largest master rank) is elected to guide the synchronization of the entire NAN cluster. However, as illustrated by FIG. 5, a malicious device (e.g., such as NAN devices 521 and 523) may abuse the NAN synchronization protocol to destabilize the synchronization of the NAN clusters 510 and 530. As shown, NAN cluster 510 may include NAN devices 511, 513, and 515 which may be exchanging NAN synchronization beacons. Additionally, NAN cluster 530, which is a neighbor of NAN cluster 510, may include NAN devices 531 and 533 which also may be exchanging NAN synchronization beacons. Further, NAN devices 521 and 523 may attempt to seize an anchor master role for NAN clusters 510 and 530 by selecting a master rank that is larger than the master ranks of the NAN devices in the cluster. For example, the NAN devices 521 and 523 may randomly and/or continuously change clock values to disrupt the synchronization and communication schedules. Additionally, NAN devices 521 and 523 may forge NAN beacons (e.g., by sending "NAN beacon attacks") to disrupt the synchronization and communication schedules of the NAN clusters 510 and 530 and/or to lure (or steer) NAN devices 511, 513, and/or 533 to another channel where the NAN devices 521 and/or 523 may attempt more effective attacking.

Additionally, in current implementations, each NAN device generates its own/individual NAN beacon protection key and uses this key to provide integrity protection of the beacon fields. For example, a NAN device pair can exchange their individual NAN beacon protection keys after they establish a pairwise secured channel, e.g., during NAN pairing and/or NAN secured data path setup. Further, when a NAN device enables beacon protection, the NAN device may attach a Management Message Integrity Check (MIC) Element (MME) to the end of each transmitted beacon. Note that all adjacent peers can still decode the beacon fields, however, peers which acquire the NAN device's individual beacon protection key can verify the integrity of the protected beacon fields, e.g., based on the MIC in the MME.

As noted, a NAN device cannot verify a peer's beacons until after it establishes a pairwise trust with the peer. In other words, the NAN device has to accept the peer's beacons, without integrity verification, during initial synchronization and service discovery. Thus, a malicious device may forge a legitimate peer's NAN beacons and lead the NAN device to a discovery window that is not overlapped with the legitimate peer's discovery window. In this manner, the malicious device can block the NAN device from receiving the legitimate peer's service discovery frames. Furthermore, some devices in a NAN neighborhood may never establish pairwise trust with each other (e.g., such as a printer and a TV); therefore, these cannot exchange beacon protection keys. Thus, if these devices only accept and synchronize to NAN beacons that pass integrity verification, they would not be able to synchronize to one another. Such a scenario may cause difficulty for a third device (e.g., such as a phone or other type of client station) to discover and establish NAN data paths with these unsynchronized devices (e.g., the printer and the TV).

Embodiments described herein provide systems, methods, and mechanisms for a wireless station (including, but not limited to, a NAN device) to establish a trusted device cluster, including provisioning, beacon protection, and policies. The trusted device cluster disclosed herein may enable authenticated members to possess shared security credentials.

In some embodiments, a trusted device cluster may be considered a NAN trusted cluster (NTC). An NTC may be a NAN cluster which enables authenticated members to possess shared NTC security credentials.

In some embodiments, shared security credentials may be a set of common keys and/or may be used by authenticated members to generate a set of common keys. The common keys may include an identity key, such as an NTC Identity Key, a beacon integrity group temporal key (BIGTK), such as an NTC BIGTK, and/or an integrity group temporal key (IGTK), such as an NTC IGTK. The trusted device cluster may be started (or initiated) by a founder member. The founder member may generate security credentials to be shared with peer devices in the trusted device cluster. A new device may be admitted into the trusted device cluster via an authenticator. The authenticator may authenticate the new device and provision the security credentials to the new device. Note that there may be one or multiple authenticators in a trusted device cluster. In some embodiments, the authenticator may authenticate and provision a new device through peer-to-peer pairing, secured data path setup, and/or through other out-of-band (OOB) means, e.g., such as authentication and provisioning through an Internet Protocol (IP) network and/or cloud. Then, once the new device is admitted into the trusted device cluster as an authenticated member, the new device may use the security credentials (e.g., keys) to protect its trusted device cluster identity, beacons, and management frames. Additionally, once the new device is admitted into the trusted device cluster as an authenticated member, the new device may use the security credentials (e.g., keys) to verify the trusted device cluster identity, beacons, and management frames transmitted by other authenticated members of the trusted device cluster.

Figure 6:
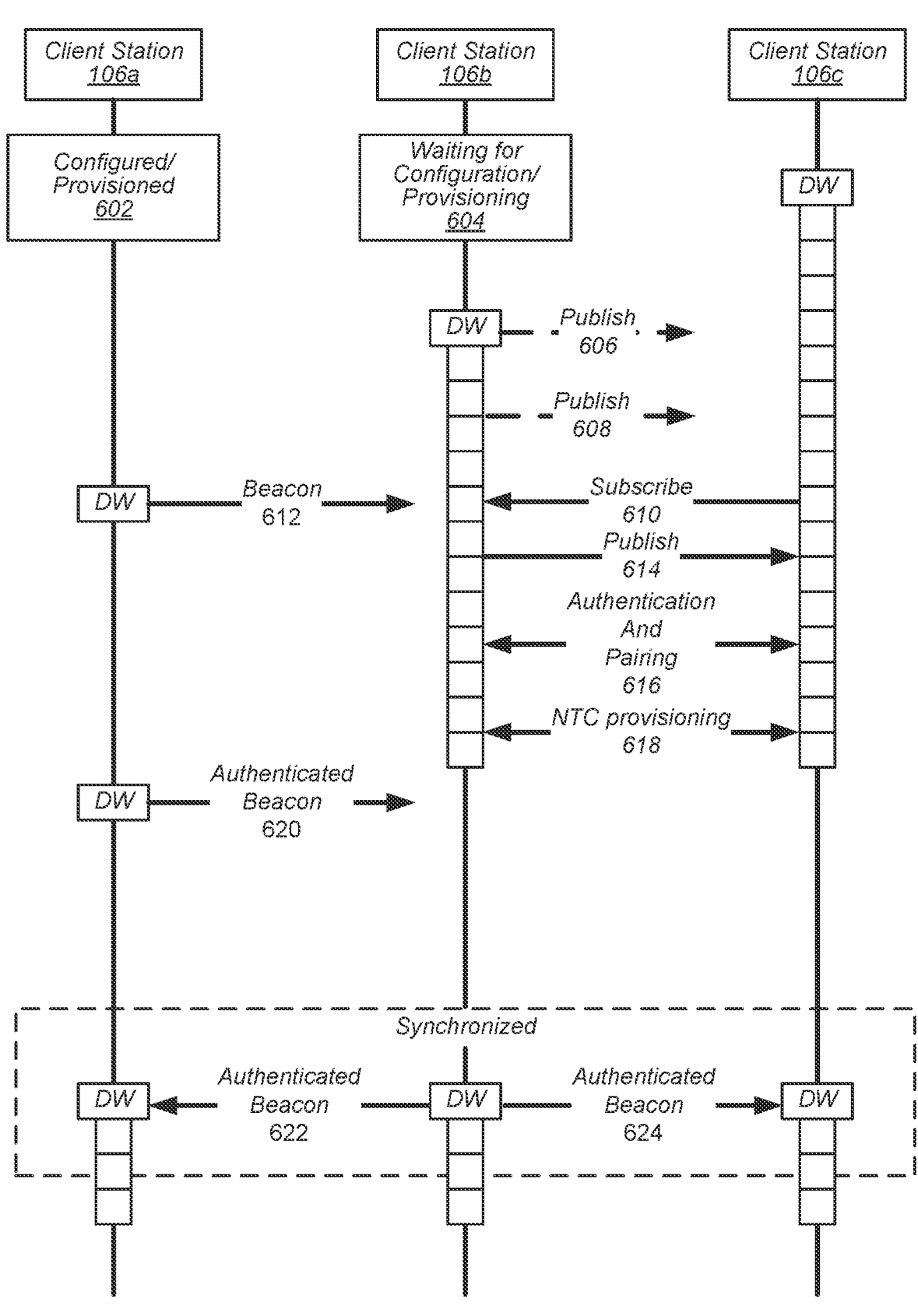
FIG. 6 illustrates an example of signaling for NAN trusted cluster (NTC) provisioning, according to some embodiments.

For example, FIG. 6 illustrates an example of signaling for NAN trusted cluster (NTC) provisioning, according to some embodiments. The signaling shown in FIG. 6 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 602, a client station, such as client station 106*a*, may be configured and/or provisioned as an authenticated member of a NAN trusted cluster (NTC) along with client station 106*c*. Note that client station 106*a* may be a stationary and/or static client station, such as a wireless printer, television, wireless speaker, wireless receiver, and/or other wireless devices. Note further that client station 106*c* may be a mobile and/or dynamic client station, such as a user equipment device (UE). In addition, client station 106*c* may server as an NTC authenticator for the NTC.

At 604, a client station, such as client station 106*b*, may be powered on and waiting for configuration and/or provisioning as an authenticated member of the NTC. Thus, at 604, client station 106*b* may not be a member of the NTC. Further, at 604, client station 106*b* may be awaiting authentication from client station 106*c* as well as provisioning of NTC credentials from client station 106*c*. Note that client station 106*b* may be a stationary and/or static client station, such as a wireless printer, television, wireless speaker, wireless receiver, and/or other wireless devices. Additionally, client station 106*b*, while awaiting configuration and/or provisioning, may enter a (special and/or unique) unsynchronized discovery mode (e.g., associated with NTC discovery, configuration, and/or provisioning), e.g., so that it does not need to rely on untrusted beacons.

As shown, when client station 106*b* is in the unsynchronized discovery mode, client station 106*b* may remain on (e.g., stay awake) and monitor a discovery channel, e.g., during a discovery window (DW). For example, client station 106*b* may stay awake and monitor a NAN discovery channel, such as channel 6 in 2.4 GHz band, for a subscribe message, such as unsolicited subscribe message 610. Note that client station 106*b* may also send unsolicited publish messages 606 and/or 608 (e.g., periodically to search for subscribers on the NAN discovery channel) but may ignore beacon 612 from client station 106*a*, e.g., since beacon 612 is not an authenticated beacon. Upon receiving subscribe message 610 (e.g., discovery of client station 106*c* as an NTC authenticator), client station 106*b* may send a solicited publish message 614 to client station 106*c*. Note that client station 106*b* may then stay awake on the NAN discovery channel to complete NTC credential provisioning as well as other configurations with client station 106*c*, e.g., via authentication and pairing messages 616 and NTC provisioning messages 618. Once provisioned, client station 106*b* may discontinue monitoring the NAN discovery channel, e.g., at least until a next DW. Thus, client station 106*b* may miss authenticated beacon 620 from client station 106*a*.

However, once synchronized, client stations 106*a*, 106*b*, and 106*c* mays monitor the NAN discovery channel (and/or some other common channel) during a common discovery window. Thus, as shown, client station 106*b* may transmit authenticated beacons 622 and/or 624 (e.g., using NTC keys obtained during NTC credential provisioning to protect the authenticated beacons) as well as verifying beacons received from client stations 106*a* and 106*c* (e.g., using NTC keys obtained during NTC credential provisioning to confirm beacons are authenticated). FIGS. 7A, 7B, and 7C illustrate examples of NTC beacon protection frame formats, according to some embodiments. As shown in FIG. 7A, an authenticated member of an NTC may protect its beacons by including one or more of an NTC-MME field, an address field indicating an NTC cluster identity (ID) field, and/or an NTC identity resolving key (IRK) attribute in each beacon. Thus, as shown, a beacon may include a frame control field, a duration field, multiple address fields A1 (e.g., indicating a broadcast address), A2 (e.g., indicating a transmitter address), and/or A3 (e.g., indicating the NTC cluster ID), a sequence control field, a time stamp field, a beacon interval field, a capability field, a NAN information element (IE) field, the NTC-MME field, as well as an FCS field. The NTC-MME field, as illustrated by FIG. 7B, may include multiple specific key identifier (ID) values to indicate that a MIC is generated by an NTC-BIGTK, e.g., instead of individual BIGTK or other IGTKs. In addition, to protect the identity of the beacon transmitter, the beacon may include an NTC identity resolving key (IRK) attribute as part of the NAN IE field, e.g., to help preserve the NTC's identity from being tracked by non-authenticated devices. As shown in FIG. 7C, a NTC IRK attribute may include an attribute ID field, a length field, a cipher suite field, an IRK nonce field, as well as a resolvable identity field. Note that when an NTC enables NTC-IRK, the NTC may change the NTC cluster ID periodically (and/or at random intervals), e.g., to avoid being tracked by non-authenticated devices. Additionally, within the NTC IRK attribute, the resolvable identity field may be given by a formula, such as Resolvable Identity=Truncate-64(HMAC-SHA-256(NIC-IRK, "NIC IRK", Cluster ID‖IRK Nonce)). Then, other authenticated members, which possess the NTC IRK, may verify the resolvable identity in the NTC IRK attribute, e.g., based on the formula.

In some embodiments, an authenticated member of an NTC may also enable a guest mode, e.g., to allow visiting devices to synchronize and connect to the authenticated member without joining the NTC. The authenticated member may provision its individual IRK and beacon protection key to a guest device (e.g., a visiting device) during pairwise authentication or data path setup with the guest device. The authenticated member may enable both NTC beacon protection and individual beacon protection, e.g., as illustrated by the beacon format of FIG. 8. As shown by FIG. 8, other authenticated members in the same NTC may verify the NTC IRK attribute and NTC-MME based on NTC keys and a guest device may verify the authenticated device's individual IRK attribute and MME based on the authenticated device's individual keys. Note that both the NTC-MME and the device's individual MME may provide integrity protection of payloads of a same beacon.

In some embodiments, an authenticated beacon, e.g., as described above, may include a synchronization policy field and/or a synchronization policy attribute, e.g., to indicate a device's synchronization policies. In some instances, a device's synchronization policies may be dependent on one or more factors, such as a device's scheduling/master rank value, whether a device is mobile (e.g., such as a UE) or static/stationary (e.g., such as a television or printer, among other static/stationary devices), and/or a configuration mode of a device. For example, a non-mobile (e.g., static/stationary device) and/or high master rank device, may operate in a unconfigured mode, a configured NTC mode, and/or a configured individual mode. In an unconfigured mode, the non-mobile/high master rank device may allow untrusted synchronization and/or rely on unsynchronized discovery. In a configured NTC mode, the non-mobile/high master rank device may trust and synchronize to NTC members only and/or may trust and synchronize to both NTC members and authenticated non-NTC members (e.g., NTC guest devices). In a configured individual mode, the non-mobile/high master rank device may trust and synchronize to authenticated peers and/or may not synchronize with any peers. As another example, a mobile and/or low master rank device may allow untrusted synchronization, rely on synchronized discovery, and/or prioritize synchronization to peers that consume a same service.

In some embodiments, the NTC protections described herein may be applied to other types of management frames, e.g., in addition to beacons, such as publish frames, subscribe frame, and/or follow up frames, as illustrated by FIG. 9A. Thus, the NTC protections may enable NTC members to verify management frames prior to establishment of a pairwise authentication and/or a data path with one another. As shown, a service discovery frame (SDF) or NAN action frame (NAF) may include a frame control field, a duration field, multiple address fields including an A1 (unicast or multicast address) field, an A2 (transmitter address) field, and an A3 (NTC cluster ID) field, a sequence control field, a time stamp field, a beacon interval field, a category field, an action field, an OUI field, an OUI type field, a NAN attributes field including an NTC IRK attribute as described above, an NTC MME field as described above, and an FCS field. In addition, as illustrated by FIG. 9B, a device may enable both NTC protection and individual protection by using NTC IGTK and individual device IGTK, respectively. As shown, a service discovery frame (SDF) or NAN action frame (NAF) may include a frame control field, a duration field, multiple address fields including an A1 (unicast or multicast address) field, an A2 (transmitter address) field, and an A3 (NTC cluster ID) field, a sequence control field, a time stamp field, a beacon interval field, a category field, an action field, an OUI field, an OUI type field, a NAN attributes field including an NTC IRK attribute and device IRK attribute as described above, an NTC MME field as described above, an MME field as described above, and an FCS field.

Figure 10:
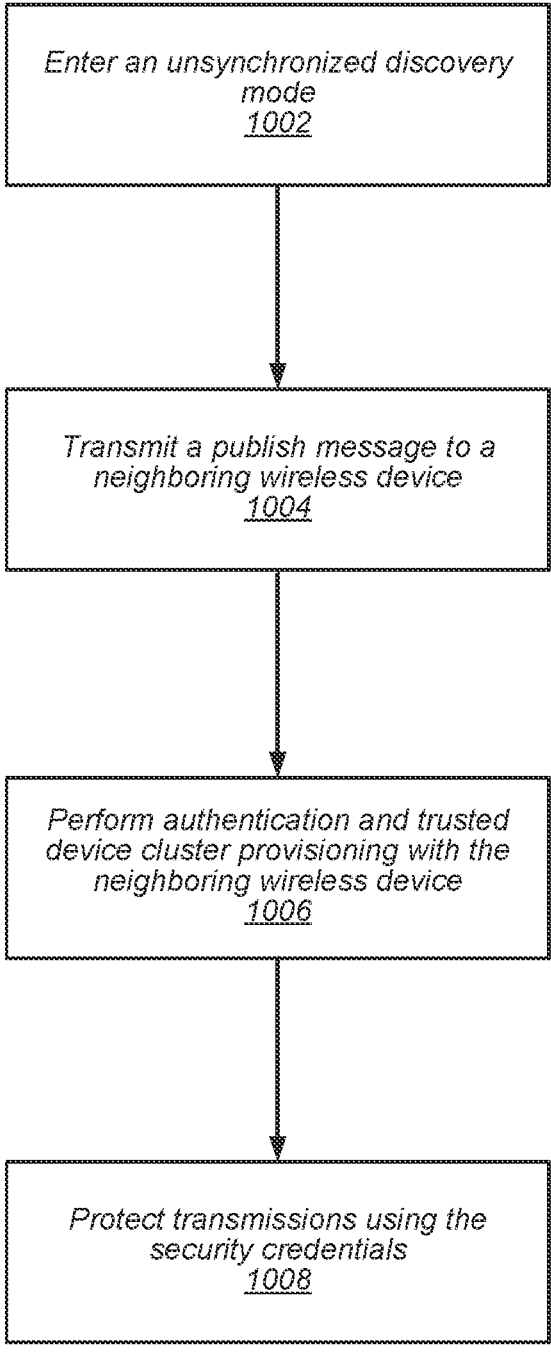
FIG. 10 illustrates a block diagram of an example of a method for trusted device cluster provisioning, according to some embodiments.

FIG. 10 illustrates a block diagram of an example of a method for trusted device cluster provisioning, according to some embodiments. The method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, a wireless device, such as client station 106, may enter an unsynchronized discovery mode. In the unsynchronized discovery mode, the wireless device may monitor a discovery channel for subscribe messages, e.g., from neighboring peer devices.

At 1004, the wireless device may transmit, in response to receiving a subscribe message from a neighboring device, a publish message to the neighboring device. The subscribe message may be an unsolicited subscribe message. The publish message may be a solicited publish message.

At 1006, the wireless device may perform authentication and trusted device cluster provisioning with the neighboring wireless device. The trusted device cluster provisioning may provide security credentials to the wireless device.

At 1008, the wireless device may protect transmissions using the security credentials. In particular, the wireless device may protect any, any combination of, and/or all of (e.g., at least one of and/or one or more of) a trusted device cluster identity, transmitted beacons, transmitted management frames, or transmitted action frames using the security credentials acquired via the trusted device cluster provisioning. In some embodiments, performing authentication and trusted device cluster provisioning may include at least one of peer-to-peer pairing, secured data path setup, and/or out-of-band verification. Note that out-of-band verification may include authentication and provisioning via an Internet Protocol (IP) network and/or via a cloud server.

In some embodiments, the wireless device may verify any, any combination of, and/or all of (e.g., at least one of and/or one or more of) a trusted device cluster identity, received beacons, received management frames, or received action frames using the security credentials acquired via the trusted device cluster provisioning.

In some embodiments, protecting transmitted beacons, transmitted management frames, and/or transmitted action frames may include the wireless device including any, any combination of, and/or all of (e.g., at least one of and/or one or more of) a Neighboring Awareness Networking (NAN) Trusted Cluster (NTC) Management Message Integrity Check (MIC) Element (MME) (NTC-MME) field, an address field indicating an NTC identity (ID) field, and/or an NTC identity resolving key (IRK) attribute in the transmitted beacons, transmitted management frames, and/or transmitted action frames. The NTC-MME field may include multiple specific key identifier (ID) values to indicate that a MIC is generated by an NTC a beacon integrity group temporal key (BIGTK). Further, the NTC IRK attribute may be included in a NAN information element (IE) field or NAN attributes field. Additionally, the NTC IRK attribute may include one or more of an attribute identifier (ID) field, a length field, a cipher suite field, an IRK nonce field, or a resolvable identity field. The resolvable identify field may be given by Truncate-64(HMAC-SHA-256(NTC-IRK, "NTC IRK", Cluster ID||IRK Nonce)). In some embodiments, when the NTC IRK attribute is enabled, the NTC ID may be periodically changed.

In some embodiments, protecting transmitted beacons, transmitted management frames, and/or transmitted action frames includes the wireless device including any, any combination of, and/or all of (e.g., at least one of and/or one or more of) of a Neighbor Awareness Networking (NAN) Trusted Cluster (NTC) Management Message Integrity Check (MIC) Element (MME) (NTC-MME) field, an address field indicating an NTC identity (ID) field, an NTC identity resolving key (IRK) attribute, an individual IRK attribute, and/or an individual MME attribute in the transmitted beacons, transmitted management frames, and/or transmitted action frames. In such embodiments, the wireless device may provision the individual IRK and a protection key to a guest device during pairwise authentication or data path setup. The provisioning of the individual IRK and the protection key may allow the guest device to temporally join the trusted device cluster.

In some embodiments, protecting transmitted beacons, transmitted management frames, and/or transmitted action frames may include the wireless device including a synchronization policy field or a synchronization policy attribute to indicate the wireless device's synchronization policies. The wireless device's synchronization policies may be based, at least in part, on any, any combination of, and/or all of (e.g., at least one of and/or one or more of) a scheduling/master rank value of the wireless device, a mobility characteristic of the wireless device, and/or a configuration mode of the wireless device. The mobility characteristic of the wireless device may indicate whether the wireless device is a stationary device or a mobile device. Additionally, the configuration mode of the wireless device may include an unconfigured mode, a configured Neighbor Awareness Networking (NAN) Trusted Cluster (NTC) mode, or a configured individual mode. Note that, when in the unconfigured mode, the wireless device may allow untrusted synchronization or relies on unsynchronized discovery. Note additionally, that when in the configured NTC mode, the wireless device may trust and synchronize to NTC members only or trust and synchronize to both NTC members and authenticated non-NTC members. Note further that when in the configured individual mode, the wireless device may trust and synchronize to authenticated peers or may not synchronize with any peers. In some embodiments, when the wireless device has a lower master rank as compared to neighboring wireless devices, the wireless device may allow untrusted synchronization, may rely on synchronized discovery, and/or may prioritize synchronization to neighboring devices that consume a same service.

In some embodiments, whether the synchronization policies are based, at least in part, on the configuration mode of the wireless device may depend on at least one of the mobility characteristic of the wireless device or a scheduling/master rank value of the wireless device. Note that as the scheduling/master rank value of the wireless device increases, a likelihood that the synchronization policies are based on the scheduling/master rank value of the wireless device may increase.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
at least one antenna;
one or more wireless interfaces in communication with the at least one antenna; and
at least one processor in communication with the one or more wireless interfaces;
wherein the at least one processor is configured to cause the wireless station to:
enter an unsynchronized discovery mode and while in the unsynchronized discovery mode:
monitor a discovery channel for subscribe messages;
transmit, in response to receiving a subscribe message from a neighboring wireless station, a publish message to the neighboring wireless station; and
perform authentication and trusted device cluster provisioning with the neighboring wireless station, wherein the trusted device cluster provisioning provides security credentials to the wireless station.

2. The wireless station of claim 1,
wherein the at least one processor is further configured to cause the wireless station to:
protect, using the security credentials acquired via the trusted device cluster provisioning, a trusted device cluster identity.

3. The wireless station of claim 2,
wherein, to protect one or more transmitted beacons, one or more transmitted management frames, or one or more transmitted action frames, the at least one processor is further configured to cause the wireless station to include one or more of a Neighboring Awareness Networking (NAN) Trusted Cluster (NTC) Management Message Integrity Check (MIC) Element (MME) (NTC-MME) field, an address field indicating an NTC identity (ID) field, or an NTC identity resolving key (IRK) attribute in the one or more transmitted beacons, one or more transmitted management frames, or one or more transmitted action frames.

4. The wireless station of claim 3,
wherein an NTC-MME field includes multiple specific key identifier (ID) values to indicate that a MIC is generated by an NTC beacon integrity group temporal key (BIGTK).

5. The wireless station of claim 3, wherein, when an NTC IRK attribute is included in a NAN information element (IE) field or a NAN attributes field, wherein the NTC IRK attribute included in the NAN information element (IE) field or the NAN attributes field includes one or more of an attribute identifier (ID) field, a length field, a cipher suite field, an IRK nonce field, or a resolvable identity field; and wherein the resolvable identify field is given by Truncate-64 (HMAC-SHA-256 (NTC-IRK, "NTC IRK", Cluster ID||IRK Nonce)).

6. The wireless station of claim 3, wherein, when an NTC IRK attribute is enabled, the NTC ID is periodically changed.

7. The wireless station of claim 3, wherein, to protect one or more transmitted beacons, one or more transmitted management frames, or one or more transmitted action frames, the at least one processor is further configured to cause the wireless station to further include an individual IRK attribute or an individual MME attribute in the one or more transmitted beacons, one or more transmitted management frames, or one or more transmitted action frames.

8. The wireless station of claim 7, wherein the at least one processor is further configured to cause the wireless station to:

provision an individual IRK and a protection key to a guest wireless station during pairwise authentication or data path setup, wherein the provisioning of the individual IRK and the protection key allows the guest wireless station to temporally join the trusted device cluster.

9. The wireless station of claim 1, wherein, to perform authentication and trusted device cluster provisioning, the at least one processor is further configured to perform at least one of:

peer-to-peer pairing;

secured data path setup; or out-of-band verification.

10. The wireless station of claim 9, wherein an out-of-band verification includes authentication and provisioning via an Internet Protocol (IP) network or via a cloud server.

11. The wireless station of claim 1, wherein the at least one processor is further configured to cause the wireless station to:

verify one or more of a trusted device cluster identity, one or more received beacons, one or more received management frames, or one or more received action frames using the security credentials acquired via the trusted device cluster provisioning.

12. An apparatus, comprising:

a memory; and at least one processor in communication with the memory, wherein the at least one processor is configured to:

generate instructions for a wireless device to enter an unsynchronized discovery mode and while the wireless device is in the unsynchronized discovery mode:

generate instructions for the wireless device to monitor a discovery channel for subscribe messages;

generate instructions for the wireless device to transmit, in response to receiving a subscribe message from a neighboring device, a publish message to the neighboring device; and generate instructions for the wireless device to protect one or more of a trusted device cluster identity, a transmitted beacon, a transmitted management frame, or a transmitted action frame using a security credential acquired via a trusted device cluster provisioning.

13. The apparatus of claim 12, wherein the at least one processor is further configured to:

perform authentication and the trusted device cluster provisioning with the neighboring device to acquire the security credential.

14. The apparatus of claim 12, wherein, to protect the transmitted beacon, the transmitted management frame, or the transmitted action frame, the at least one processor is further configured to include a synchronization policy field or a synchronization policy attribute to indicate a synchronization policy of the wireless device, wherein the synchronization policy is based, at least in part, on one or more of a scheduling/master rank value of the wireless device, a mobility characteristic of the wireless device, or a configuration mode of the wireless device.

15. The apparatus of claim 14, wherein a mobility characteristic of the wireless device indicates whether the wireless device is a stationary device or a mobile device, and wherein the configuration mode of the wireless device includes an unconfigured mode, a configured Neighbor Awareness Networking (NAN) Trusted Cluster (NTC) mode, or a configured individual mode.

16. The apparatus of claim 12, wherein the at least one processor is further configured to:

verify one or more of a trusted device cluster identity, a received beacon, a received management frame, or a received action frame using the security credential acquired via the trusted device cluster provisioning.

17. A non-transitory computer readable memory medium storing program instructions executable by a processor of a wireless device to:

enter an unsynchronized discovery mode and while the wireless device is in the unsynchronized discovery mode:

monitor a discovery channel for subscribe messages;

transmit, in response to receiving a subscribe message from a neighboring wireless device, a publish message to the neighboring wireless device; and protect one or more of a trusted device cluster identity, a transmitted beacon, a transmitted management frame, or a transmitted action frame using a security credential acquired via a trusted device cluster provisioning.

18. The non-transitory computer readable memory medium storing program instructions of claim 17, wherein, to protect the transmitted beacon, the transmitted management frame, or the transmitted action frame, the program instructions are further executable by the processor of the wireless device to include a synchronization policy field or a synchronization policy attribute to indicate a synchronization policy of the wireless device, wherein the synchronization policy is based, at least in part, on one or more of scheduling/master rank value of the wireless device, a mobility characteristic of the wireless device, or a configuration mode of the wireless device;

wherein a configuration mode of the wireless device includes an unconfigured mode, a configured Neighbor Awareness Networking (NAN) Trusted Cluster (NTC) mode, or a configured individual mode;

wherein, when in an unconfigured mode, the program instructions are further executable by the processor of the wireless device to allow untrusted synchronization or rely on unsynchronized discovery;

wherein, when in an configured NAN NTC mode, the program instructions are further executable by the processor of the wireless device to trust and synchronize to NTC members only or trust and synchronize to both NTC members and authenticated non-NTC members; and wherein, when in a configured individual mode, the program instructions are further executable by the processor of the wireless device to trust and synchronize to authenticated peers or may not synchronize with any peers.

19. The non-transitory computer readable memory medium storing program instructions of claim 18, wherein, when the wireless device has a lower master rank as compared to a neighboring wireless device, the program instructions are further executable by the processor of the wireless device to allow untrusted synchronization, rely on synchronized discovery, or prioritize synchronization to a neighboring wireless device that consumes a same service.

20. The non-transitory computer readable memory medium storing program instructions of claim 18, wherein, whether the synchronization policy is based, at least in part, on a configuration mode of the wireless device depends on at least one of the mobility characteristic of the wireless device or the scheduling/master rank value of the wireless device; and wherein as the scheduling/master rank value of the wireless device increases, a likelihood that the synchronization policy is based on the scheduling/master rank value of the wireless device increases.

* * * * *